(12) United States Patent
Kitayama et al.

(10) Patent No.: US 8,853,457 B2
(45) Date of Patent: Oct. 7, 2014

(54) POLYAMINE AND METHOD FOR PRODUCING THEREOF

(75) Inventors: Hiroyuki Kitayama, Yao (JP); Hironao Sajiki, Gifu (JP); Yasunari Monguchi, Gifu (JP)

(73) Assignee: Rhodia Operations, Paris (FR)

( * ) Notice: Subject to any disclaimer, the term of this patent is extended or adjusted under 35 U.S.C. 154(b) by 16 days.

(21) Appl. No.: 13/520,770

(22) PCT Filed: Dec. 17, 2010

(86) PCT No.: PCT/JP2010/072794
§ 371 (c)(1),
(2), (4) Date: Sep. 26, 2012

(87) PCT Pub. No.: WO2011/081038
PCT Pub. Date: Jul. 7, 2011

(65) Prior Publication Data
US 2013/0123542 A1 May 16, 2013

(30) Foreign Application Priority Data
Jan. 4, 2010 (JP) ................. 2010-000211

(51) Int. Cl.
 *C07C 209/52* (2006.01)
 *C08G 73/02* (2006.01)
(52) U.S. Cl.
 CPC ........ *C08G 73/0206* (2013.01); *C08G 73/0213* (2013.01)
 USPC ............ 564/469; 564/330; 564/489; 564/512
(58) Field of Classification Search
 None
 See application file for complete search history.

(56) References Cited

U.S. PATENT DOCUMENTS

| | | | |
|---|---|---|---|
| 3,217,028 A | 11/1965 | Vertnik | |
| 3,391,127 A | 7/1968 | Kamal | |
| 4,250,112 A | 2/1981 | Lobach et al. | |
| 4,324,724 A * | 4/1982 | Mueller et al. | ................ 544/402 |
| 4,990,672 A | 2/1991 | Johnson | |
| 6,136,943 A | 10/2000 | Kawashima et al. | |

FOREIGN PATENT DOCUMENTS

| | | |
|---|---|---|
| CN | 88100500 A | 9/1988 |
| CN | 1361805 A | 7/2002 |
| EP | 0277635 A2 | 8/1988 |
| EP | 0308893 A1 | 3/1989 |
| GB | 1356455 A | 6/1974 |
| JP | 54-80400 A | 6/1979 |
| JP | 54-146900 A | 11/1979 |
| JP | 11-158271 A | 6/1999 |
| JP | 11-193315 A | 7/1999 |
| WO | 01/05874 A1 | 1/2001 |

OTHER PUBLICATIONS

Cobley et al., "Platinum catalysed hydrolytic amidation of unactivated nitriles," Tetrahedron Letters, 2000, pp. 2467-2470, vol. 41.
International Search Report issued on Mar. 29, 2011, by the Japanese Patent Office as the International Searching Authority in PCT/JP2010/072794, and an English language translation of the Search Report.

* cited by examiner

*Primary Examiner* — Brian J Davis
(74) *Attorney, Agent, or Firm* — Dentons US LLP

(57) ABSTRACT

A method for producing a polyamine is described that provides excellent safety, a lot of flexibility regarding a variety of its productions, and that can produce a polyamine of high-molecular weight easily and inexpensively.
The polyamine includes a combination of units of formula (1) or (2):

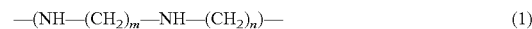

(in the formula (1), independently in every unit, "m" indicates an integral number of 0 or more and "n" indicates an integral number of 3 or more.)

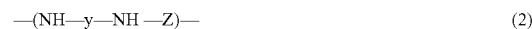

(in the formula (2), independently in every unit, "Y" and "Z" are the same as or different from each other, and they indicate substituted or unsubstituted groups including unsaturated aliphatic, cyclic aliphatic or aromatic hydrocarbon radicals that can include hetero atoms.).

17 Claims, 2 Drawing Sheets

POLYAMINE AND METHOD FOR PRODUCING THEREOF

CROSS-REFERENCE TO PRIOR APPLICATIONS

This application is a National Stage of PCT/JP2010/072794, filed Dec. 17, 2010, and designating the United States (published in Japanese on Jul. 7, 2011, as WO 2011/081038 A1; the title and abstract were published in English), which claims priority of JP 2010-000211, filed Jan. 4, 2010, each hereby expressly incorporated by reference in its entirety and each assigned to the assignee hereof.

FIELD OF THE INVENTION

The present invention relates to polyamine and method for producing thereof.

BACKGROUND OF THE INVENTION

Polyamine can have a wide variety of application in both industrial and personal application fields, and it is used in, for example, a wide variety of neutralizing agents, hardening agents of epoxy, processing agents of textiles, paper chemicals, coating agents, moisturizing agents of cosmetics, settling agents, reformation agents for flowability of concrete, and the like.

DESCRIPTION OF THE RELATED ART

The method for producing polyamine of synthetic polymer are well-known as disclosed in, for example, Japanese Patent Application Laid-Open Publication No. 11-158271. However, its synthetic approaches are limited. Polyamines of high-molecular weight that are industrially produced are only polyethylene imine, polyvinyl amine and polyallyl amine.

However, with regard to polyethylene imine that is a typical representative of polyamine of synthetic polymer, its basic ingredients include ethylene imine that is highly toxic. Accordingly, there is a problem in the light of safety and environmental protection. Therefore, it is not allowed to leave its monomer in productions. As a result, it is necessary to conduct a cleaning operation of the monomer at the production and at replacement of facilities, and then it drives up the cost of the production.

In addition, cyclic amines that can be used as the monomer are not produced. Accordingly, with regard to monomer unit, a carbon number of the monomer is limited to two. Therefore, in the light of the variety of polyamine that can be produced, there is few flexibility.

Further, with regard to conventional methods for producing ethylene diamine, though a small quantity of polymer can be produced in a reaction of ammonia and ethylene dichloride, most of its molecular weight is 200 to 300, and therefore it cannot be deemed to be a high polymers. In addition, its appearance is similar to that of pitch or tar component that includes polymers of a wide variety of isomeric forms and molecular weight.

Further, there is a method of reacting ammonia and dihalogeno compound other than ethylene dichloride in order to change alkylene chain. However, as with producing of ethylene diamine, polymer that can be produced is mostly that of low-molecular weight. Even in the case of trying to produce polymer of high-molecular weight, only polymer of low-molecular weight that has complicated composition like tar is produced because it is difficult to control the reaction.

With regard to other methods for producing polyalkylene amine polymer, there is a method of producing Schiff base polymer by reacting diamine and dialdehyde, and then reducing it. However, it is difficult to accomplish the reaction because the method relates to a reduction of polymer. Accordingly, there are problems in solubility and reactivity of substrate, and efficiency of the reduction. Therefore, it is difficult to produce the polyamine of high-molecular weight, though it is possible to produce the polymer that has the molecular weight of oligomer.

SUMMARY OF THE INVENTION

An object of the present application is to provide novel polyamine and a method for producing thereof that has excellent safety, a lot of flexibility regarding a variety of its products, and that can produce the polyamine of high-molecular weight easily and inexpensively.

In a production of polyamine, polyamine in the form of white powder and viscous liquid can be produced by reductive condensation of diamine and dinitrile in water/alcohol solution by hydrogen with appropriately controlling pH of the reaction solution in the presence of a supported platinum group metal catalyst. However, in the above synthesis of amine by the reductive condensation, the platinum group metal catalyst constitutes inert complexes as described in the following formula (A). Therefore, the reaction does not proceed and only products of low-molecular weight can be provided. In addition, it is difficult to recover and reuse the supported platinum group metal catalyst because the complexes as described in the formula (A) elutes into the reaction solution.

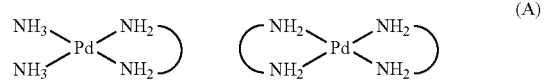

(A)

The inventors have drawn attention to the above problems and extensively investigated to overcome them. As a result, they have found the facts that it is necessary for amino groups related to the reaction to be not in the condition of salt but in the condition of free as functional groups. They also have found the facts that the catalytic activity deteriorates enormously because metal catalyst and diamine that is a basic ingredient and/or ammonia form a complex in the high pH condition where the ammonia by-product in the reaction of the amine and nitrile that are basic ingredients exists. Further, they found the facts that the novel polyamine of high-molecular weight can be provided by a method for producing polyamine that can solve the above problems.

In one aspect, the present invention completed as the basis of the above knowledge is:

a polyamine comprising a combination of units of the general formula (1) or (2):

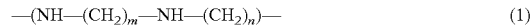  (1)

(in the formula (1), independently in every unit, "m" indicates an integral number of 0 or more and "n" indicates an integral number of 3 or more.)

  (2)

(in the formula (2), independently in every unit, "Y" and "Z" are the same as or different from each other, and they indicate substituted or unsubstituted groups comprising unsaturated aliphatic, cyclic aliphatic or aromatic hydrocarbon radical that may includes hetero atoms.)

In one embodiment, the present invention is:
the polyamine wherein the "m"s and/or "n"s of the formula (1) are the same as each other among the combined units.
In preferred embodiment, the present invention is:
the polyamine wherein the "Y"s and/or "Z"s of the formula (2) are the same as each other among the combined units.
In another preferred embodiment, the present invention is:
the polyamine wherein the polyamine comprises a polymer of molecular weight of 1000 or more as it is measured by a mass spectrum.
In another aspect, the present invention is:
a polyamine obtained by a reductive polycondensation polymerization of diamine and dinitrile, the diamine being at least one selected from the group consisting of substituted or unsubstituted diamine, aliphatic diamine, aromatic diamine and aliphatic-aromatic combined diamine.
In one embodiment, the present invention is:
The polyamine wherein
the aliphatic diamine is at least one selected from the group consisting of ethylenediamine, 1,2-propylenediamine, 1,3-propylenediamine, 1,2-butylenediamine, 1,3-butylenediamine, 1,4-butylenediamine, 2,3-butylenediamine, 1,2-cyclohexanediamine, 1,3-cyclohexanediamine, 1,4-cyclohexanediamine, hydrazine, pentamethylenediamine, hexamethylenediamine, heptamethylenediamine, octamethylenediamine, nonamethylenediamine, decamethylenediamine, undecamethylenediamine, dodecamethylenediamine, piperazine, diaminopiperazine, imidazolidine, diethylenetriamine, triethylenetetramine, 3-oxa-1,5-diaminopentane, 1,3-diamino-2-propanol, 2-acetoxy-1,3-propanediamine, lysine, 2,4-diaminobutanoic acid and 2,3-diaminosuccinic acid,
the aromatic diamine is at least one selected from the group consisting of 1,2-phenylenediamine, 1,3-phenylenediamine, 1,4-phenylenediamine, tolylenediamine, naphthalenediamine, N,N-diphenylethylenediamine, 3,3'-methylenedianiline, 4,4'-methylenedianiline, 1,1'-binaphthyl-2,2'-diamine, diaminoferrocene, 2,2'-diaminobiphenyl, 2,3'-diaminobiphenyl, 2,4'-diaminobiphenyl, 3,3'-diaminobiphenyl, 3,4'-diaminobiphenyl, benzidine, 2,7-diamino-9H-fluorene, 2,3-diaminopyridine, 2,4-diaminopyridine, 2,5-diaminopyridine, 2,6-diaminopyridine, 3,4-diaminopyridine, 3,5-diaminopyridine, 2,3-diaminophenol, 2,4-diaminophenol, 2,5-diaminophenol, 2,6-diaminophenol, 3,4-diaminophenol, 3,5-diaminophenol, 2,4-diaminopyrimidine, 2,5-diaminopyrimidine, 4,5-diaminopyrimidine, 4,6-diaminopyrimidine, 2,3-diaminobenzotrifluoride, 2,4-diaminobenzotrifluoride, 2,5-diaminobenzotrifluoride, 2,6-diaminobenzotrifluoride, 3,4-diaminobenzotrifluoride, 3,5-diaminobenzotrifluoride, 2,3-diaminobenzoic acid, 2,4-diaminobenzoic acid, 2,5-diaminobenzoic acid, 2,6-diaminobenzoic acid, 3,4-diaminobenzoic acid, 3,5-diaminobenzoic acid, 2,3-diaminobenzamide, 2,4-diaminobenzamide, 2,5-diaminobenzamide, 2,6-diaminobenzamide, 3,4-diaminobenzamide and 3,5-diaminobenzamide,
the aliphatic-aromatic combined diamine is at least one selected from the group consisting of o-xylenediamine, m-xylenediamine, p-xylenediamine and methylaminoaniline, and
the substituted group is at least one selected from the group consisting of alkyl group, carboxyl group, ester group, alkoxy group, hydroxyl group, tertiary amine, aromatic hydrocarbon group and perfluoro alkyl group.
In preferred embodiment, the present invention is:
The polyamine wherein the dinitrile is at least one selected from the group consisting of aliphatic dinitrile, aromatic dinitrile and aliphatic-aromatic combined dinitrile.

In another preferred embodiment, the present invention is:
The polyamine wherein
the aliphatic dinitrile is at least one selected from the group consisting of malononitrile, succinonitrile, trimethylenedinitrile, adiponitrile, 2-methylglutaronitirile, pimelonitrile, suberonitrile, decanedinitrile, undecanedinitrile, dodecanedinitrile, 3-oxaglutaronitrile, 1,2-cyclopentanedinitirle, 1,3-cyclopentanedinitirle, 1,2-cyclohexanedinitrile, 1,3-cyclohexanedinitrile, 1,4-cyclohexanedinitrile, 2,4-dicyano-3-methylglutaramide, 4-azaheptanedinitirle and N-alkyl-4-azaheptanedinitrile,
the aromatic dinitrile is at least one selected from the group consisting of phthalonitrile, isophthalonitrile, terephthalonitrile, toluoylenediamine, naphthalenedinitirle, 2,4-dicyanoimidazole, 2,5-dicyanoimidazole, 4,5-dicyanoimidazole, 2,3-dicyanopyridine, 2,4-dicyanopyridine, 2,5-dicyanopyridine, 3,4-dicyanopyridine, 3,5-dicyanopyridine and tetrafluorophthalonitile,
the aliphatic-aromatic combined dinitrile is at least one selected from the group consisting of 1,2-phenylenediacetonitrile, 1,3-phenylenediacetonitrile, 1,4-phenylenediacetonitrile, 1,2-cyanomethylbenzonitrile, 1,3-cyanomethylbenzonitrile, 1,4-cyanomethylbenzonitrile, 3-(2-cyanophenoxy)propionitrile, 3-(3-cyanophenoxy)propionitrile, 3-(4-cyanophenoxy)propionitrile, 1,2-di(2-cyanoethoxy)benzene, 1,3-di(2-cyanoethoxy)benzene and 1,4-di(2-cyanoethoxy)benzene, and
the substituted group is at least one selected from the group consisting of alkyl group, carboxyl group, ester group, alkoxy group, hydroxyl group, tertiary amine, aromatic hydrocarbon group and perfluoro alkyl group.
In another aspect, the present invention is:
a method for producing a polyamine comprising a reductive polycondensation polymerization of diamine and dinitrile with elimination of ammonia in the condition of keeping pH of a reaction system more basic than the neutralization point of the diamine and more acidic than the pH to form a complex of a diamine and a metal catalyst.
In one embodiment, the present invention is:
the method wherein the diamine is provided by a reduction of dinitrile.
In preferred embodiment, the present invention is:
a method for producing a polyamine comprising a reductive polycondensation polymerization of aminonitrile with elimination of ammonia in the condition of keeping pH of a reaction system more basic than the neutralization point of the amine and more acidic than the pH to form a complex of a diamine and a metal catalyst.
In another preferred embodiment, the present invention is:
consisting of glycinonitrile, aminopropionitorile, 2-aminobenzonitrile, 3-aminobenzonitrile, 4-aminobenzonitrile, 2-aminomethylbenzonitrile, 3-aminomethylbenzonitrile and 4-aminomethylbenzonitrile.
In another preferred embodiment, the present invention is:
the method wherein the elimination of ammonia is conducted by providing hydrogen to the reaction system in the presence of a platinum group metal catalyst.
In another preferred embodiment, the present invention is:
the method wherein the platinum group metal catalyst is palladium or rhodium.
In another preferred embodiment, the present invention is:
the method wherein the pH of the reaction system is kept at 10 or less.
In another preferred embodiment, the present invention is:
the method wherein the pH of the reaction system is kept at 7 to 9.

In another preferred embodiment, the present invention is:
the method wherein solvent used in the reaction system is water or hydrophilic solvent.

In another preferred embodiment, the present invention is:
the method wherein the hydrophilic solvent is a solvent selected from the group consisting of alcohol, tetrahydrofuran, dioxane and dimethylformamide.

In another preferred embodiment, the present invention is:
the method wherein initial pH of the reaction system is controlled by a pH-adjusting agent.

In another preferred embodiment, the present invention is:
the method wherein the pH of the reaction system is controlled by a neutralization of ammonia produced in the reaction system.

In another preferred embodiment, the present invention is:
the method wherein mineral acid is used in the neutralization of ammonia.

In another preferred embodiment, the present invention is:
the method wherein the pH of the reaction system is controlled by a degassing of ammonia produced in the reaction system with hydrogen.

In another preferred embodiment, the present invention is:
the method wherein the hydrogen used in the degassing of ammonia is reused in the elimination of ammonia.

In another preferred embodiment, the present invention is:
the method wherein the metal catalyst used in the reductive polycondensation polymerization is a metal catalyst that was used in the other reductive polycondensation polymerization.

In another preferred embodiment, the present invention is:
the method wherein the metal catalyst used in the reductive polycondensation polymerization is a metal catalyst that was used in the other reductive polycondensation polymerization and washed by acid.

DESCRIPTION OF THE PREFERRED EMBODIMENT (Polyamine)

Figure 1:
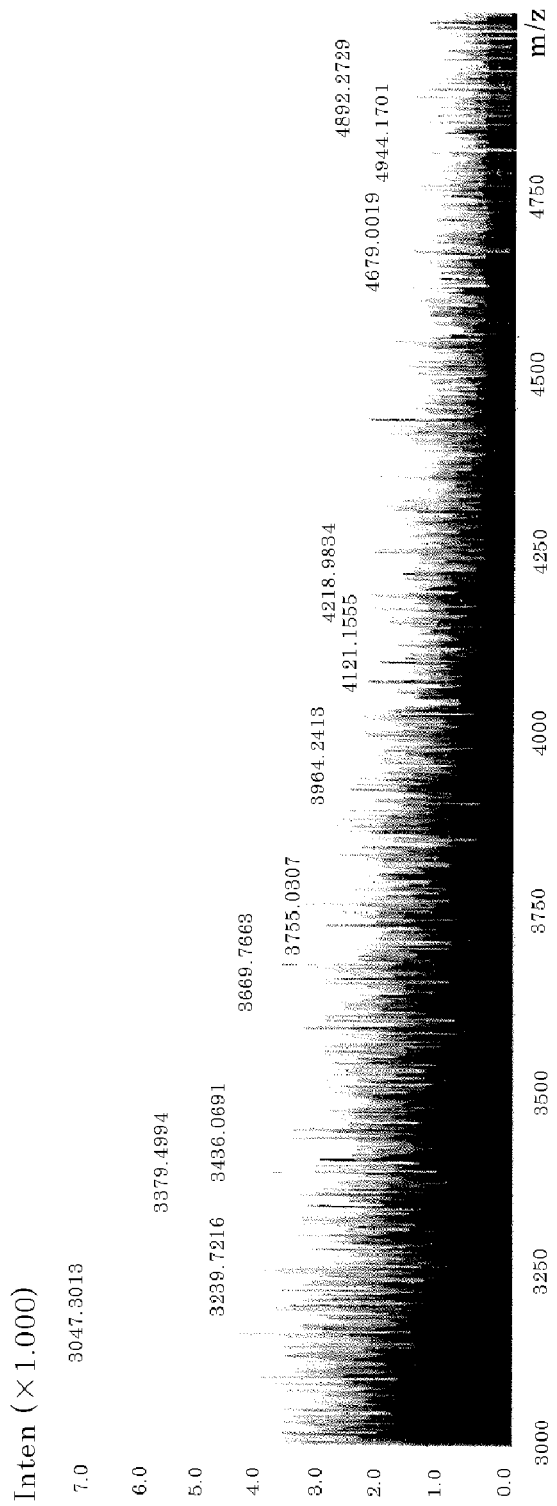
FIG. 1 is a IT-TOF-MASS chart of the polymer of Example 2.

In the preferred embodiment, the polyamine of the present invention comprises:
a combination of units of the general formula (1) or (2):

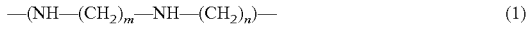

(in the formula (1), independently in every unit, "m" indicates an integral number of 0 or more and "n" indicates an integral number of 3 or more.)

(in the formula (2), independently in every unit, "Y" and "Z" are the same as or different from each other, and they indicate substituted or unsubstituted groups comprising unsaturated aliphatic, cyclic aliphatic or aromatic hydrocarbon radical that may includes hetero atoms.)

The polyamine may be a linear polymer composed of repeated units of the formula (1) or (2). The polyamine may be a branched polymer composed of repeated units of the formula (1) or (2). The "m"s and/or "n"s of the formula (1) may be the same as each other among the combined units. The "Y"s and/or "Z"s of the formula (2) may be the same as each other among the combined units. The "m" is about 0 to 20 and the "n" is about 3 to 20 because available monomers as basic ingredients are actually limited at this moment. However, if the number of kinds of the available monomers increases in the future, the numbers of the "m" and "n" also increase accordingly as a matter of course. Both ends of the polyamine have, for example, $NH_2$ group.

The linear polyamine of high-molecular weight can have a wide variety of application in both industrial and personal application fields. However, only polyethyleneimine is produced as a main-chain type polyamine so far. Correspondingly, the present invention can provide the wide variety of the main-chain type linear polyamines as described above.

The branched polyamine composed of the repeated units may have a repeated unit of the following general formula (3) or (4) in its branched parts:

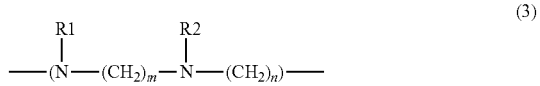

(in the formula (3), "m" indicates an integral number of 1 or more, "n" indicates an integral number of 3 or more. R1 and R2 are the same as or different from each other and they are groups further comprising H or the repeated unit of the formula (3).)

(in the formula (4), "Y" and "Z" are the same as or different from each other, and they indicate substituted or unsubstituted groups comprising unsaturated aliphatic, cyclic aliphatic or aromatic hydrocarbon radical that may includes hetero atoms. R3 and R4 are the same as or different from each other and they are groups further comprising H or the repeated unit of the formula (4).)

The branched polyamine composed of the repeated units may have a net-like structure including, for example, primary, secondary and tertiary amines.

The polyamine of the present invention may be a block polymer, a graft polymer or random polymer.

The polyamine of the present invention may be a polyamine of high-molecular weight being 1,000 or more, preferably 10,000 or more, more preferably 30,000 or more, further preferably 70,000 or more, further preferably 100,000 or more. The polyamine of the present invention has advantages of suppressed hazardousness to a human body and broad availability because it is a polymer of high-molecular weight as described above.

It is difficult to measure an absolute molecular weight of the polyamine directly. However, it is deemed that the polyamine is a polymer of high-molecular weight being distributed in a range of several tens of thousands or more because it is found when measured by a mass spectrum that polymers of molecular weight being less than 30,000 do not exist and it is found when measured by a IT-TOF-MASS that a lot of polyvalent ions exist in 3,000 to 4,000 (mass number).

The polyamine of the present invention may be a polyamine obtained by a reductive polycondensation polymerization of diamine and dinitrile. The diamine is at least one selected from the group consisting of substituted or unsubstituted diamine, aliphatic diamine, aromatic diamine and aliphatic-aromatic combined diamine. The aliphatic diamine is not limited particularly, but may be, for example, at least one selected from the group consisting of ethylenediamine, 1,2-propylenediamine, 1,3-propylenediamine, 1,2-butylenediamine, 1,3-butylenediamine, 1,4-butylenediamine, 2,3-butylenediamine, 1,2-cyclohexanediamine, 1,3-cyclohexanediamine, 1,4-cyclohexanediamine, hydrazine, pentamethylenediamine, hexamethylenediamine, heptamethylenediamine, octamethylenediamine, nonamethylenediamine, decamethylenediamine, undecamethylenediamine, dodecamethylenediamine, piperazine, diaminopiperazine, imidazolidine, diethylenetriamine, triethylenetetramine, 3-oxa-1,5-diaminopentane, 1,3-diamino-2-propanol, 2-acetoxy-1,3-propanediamine, lysine, 2,4-diaminobutanoic acid and 2,3-diaminosuccinic acid. The aromatic diamine is not limited particularly, but may be, for example, at least one selected from the group consisting of 1,2-phenylenediamine, 1,3-phenylenediamine, 1,4-phenylenediamine, tolylenediamine, naphthalenediamine, N,N-diphenylethylenediamine, 3,3'-methylenedianiline, 4,4'-methylenedianiline, 1,1'-binaphthyl-2,2'-diamine, diaminoferrocene, 2,2'-diaminobiphenyl, 2,3'-diaminobiphenyl, 2,4'-diaminobiphenyl, 3,3'-diaminobiphenyl, 3,4'-diaminobiphenyl, benzidine, 2,7-diamino-9H-fluorene, 2,3-diaminopyridine, 2,4-diaminopyridine, 2,5-diaminopyridine, 2,6-diaminopyridine, 3,4-diaminopyridine, 3,5-diaminopyridine, 2,3-diaminophenol, 2,4-diaminophenol, 2,5-diaminophenol, 2,6-diaminophenol, 3,4-diaminophenol, 3,5-diaminophenol, 2,4-diaminopyrimidine, 2,5-diaminopyrimidine, 4,5-diaminopyrimidine, 4,6-diaminopyrimidine, 2,3-diaminobenzotrifluoride, 2,4-diaminobenzotrifluoride, 2,5-diaminobenzotrifluoride, 2,6-diaminobenzotrifluoride, 3,4-diaminobenzotrifluoride, 3,5-diaminobenzotrifluoride, 2,3-diaminobenzoic acid, 2,4-diaminobenzoic acid, 2,5-diaminobenzoic acid, 2,6-diaminobenzoic acid, 3,4-diaminobenzoic acid, 3,5-diaminobenzoic acid, 2,3-diaminobenzamide, 2,4-diaminobenzamide, 2,5-diaminobenzamide, 2,6-diaminobenzamide, 3,4-diaminobenzamide and 3,5-diaminobenzamide. The aliphatic-aromatic combined diamine is not limited particularly, but may be, for example, at least one selected from the group consisting of o-xylenediamine, m-xylenediamine, p-xylenediamine and methylaminoaniline. The substituted group is not limited particularly, but may be, for example, at least one selected from the group consisting of alkyl group, carboxyl group, ester group, alkoxy group, hydroxyl group, tertiary amine, aromatic hydrocarbon group and perfluoro alkyl group.

The dinitrile is not limited particularly, but may be, for example, at least one selected from the group consisting of aliphatic dinitrile, aromatic dinitrile and aliphatic-aromatic combined dinitrile. The aliphatic dinitrile is not limited particularly, but may be, for example, at least one selected from the group consisting of malononitrile, succinonitrile, trimethylenedinitrile, adiponitrile, 2-methylglutaronitirile, pimelonitrile, suberonitrile, decanedinitrile, undecanedinitrile, dodecanedinitrile, 3-oxaglutaronitrile, 1,2-cyclopentanedinitirle, 1,3-cyclopentanedinitrile, 1,2-cyclohexanedinitrile, 1,3-cyclohexanedinitrile, 1,4-cyclohexanedinitrile, 2,4-dicyano-3-methylglutaramide, 4-azaheptanedinitirle and N-alkyl-4-azaheptanedinitrile. The aromatic dinitrile is not limited particularly, but may be, for example, at least one selected from the group consisting of phthalonitrile, isophthalonitrile, terephthalonitrile, toluoylenediamine, naphthalenedinitirle, 2,4-dicyanoimidazole, 2,5-dicyanoimidazole, 4,5-dicyanoimidazole, 2,3-dicyanopyridine, 2,4-dicyanopyridine, 2,5-dicyanopyridine, 3,4-dicyanopyridine, 3,5-dicyanopyridine and tetrafluorophthalonitile. The aliphatic-aromatic combined dinitrile is not limited particularly, but may be, for example, at least one selected from the group consisting of 1,2-phenylenediacetonitrile, 1,3-phenylenediacetonitrile, 1,4-phenylenediacetonitrile, 1,2-cyanomethylbenzonitrile, 1,3-cyanomethylbenzonitrile, 1,4-cyanomethylbenzonitrile, 3-(2-cyanophenoxy)propionitrile, 3-(3-cyanophenoxy)propionitrile, 3-(4-cyanophenoxy)propionitrile, 1,2-di(2-cyanoethoxy)benzene, 1,3-di(2-cyanoethoxy)benzene and 1,4-di(2-cyanoethoxy)benzene. The substituted group is not limited particularly, but may be, for example, at least one selected from the group consisting of alkyl group, carboxyl group, ester group, alkoxy group, hydroxyl group, tertiary amine, aromatic hydrocarbon group and perfluoro alkyl group.

The polyamine of the present invention has primary, secondary and/or tertiary amines and then excellent water solubility. A nonhazardous polyamine can be provided by selecting substituent groups and the like of its monomer. Therefore, the polyamine of the present invention can have a wide variety of application, and it is useful as, for example, a moisturizing agent of shampoo, cosmetics and the like, a neutralizing agent, an ink adherence improving agent, a dispersing agent of pigment, a hardening agent of epoxy and the like, a aggregating agent, a water processing agent, a flowability improving agent of concrete, an additive agent for metal plating, a bubble maintaining agent for extinguisher, paper, fabric, a laminate anchoring agent of film, a heavy metal chelating agent, a coating agent for inhibition of metal oxidation, and further a substrate of DDS (Drug Delivery System) that recently attracts attention.

(Method for Producing the Polyamine)

The method for producing the polyamine of the present invention comprises a reductive polycondensation polymerization of diamine and dinitrile with elimination of ammonia in the condition of keeping pH of a reaction system more basic than the neutralization point of the diamine and more acidic than the pH to form a complex of a diamine and a metal catalyst.

Theoretical summary of a hypothetical reaction mechanism of the reductive polycondensation polymerization of diamine and dinitrile with elimination of ammonia can be explained by the following general formula (7) where a palladium catalyst is used as an example. In the formula (7), for the sake of simplicity, diamine is shown as "R—NH$_2$" that is described about only one of terminal amino groups, and dinitrile is shown as "R'—CN" that is described about only one of terminal nitrile groups. In this case, Pd is used as a metal catalyst.

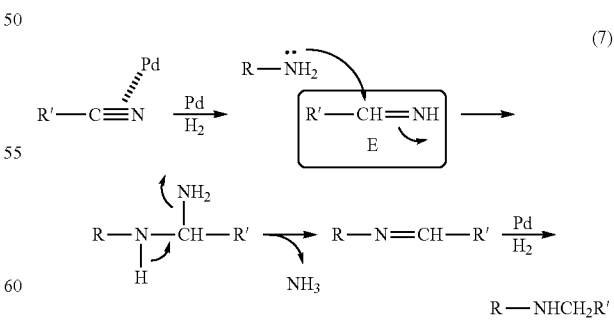

(7)

Firstly, the dinitrile R'—CN is reduced to the imine intermediate (E) by the first hydrogen contact reduction in the reaction mechanism in the formula (7). As a result of this, a polymerization reaction begins. The imine intermediate (E)

eliminates ammonia by a nucleophilic attack in priority to the second hydrogen contact reduction. Then the second hydrogen contact reduction is conducted and the reaction proceeds. Then R—NHCH$_2$—R' that has an amino group in one end and a nitrile group in the other end is provided. The amino group and the nitrile group in each end further reacts in the reaction mechanism of the formula (7) and then the linear polyamine of high-molecular weight is provided.

Further, in the reaction mechanism of the formula (7), the nucleophilic attack by the secondary amine of the provided R—NHCH$_2$—R' to an analog of the imine intermediate ((R)(R'CH$_2$)N(+)=CH—R') produces the branched polyamine, and the polyamine that has a net-like structure is provided by repeat of the reaction.

However, the imine intermediate (E) is coordinated with palladium. Accordingly, the primary amine is likely to react in priority to the bulky secondary amine. Therefore, it is basically deemed that the linear polymer is provided dominantly.

As mentioned above, the method for producing the polyamine of the present invention makes use of the reaction with the amino group in the end of the diamine and the nitrile in the end of the dinitrile which are starting materials, and the method is impervious to constructions between the amino groups in both ends of the diamine and between the nitrile groups in both ends of the dinitrile. Therefore, polyamines of desired constitutions can be produced by selecting predetermined diamines and dinitriles.

In the method for producing the polyamine of the present invention, a formation of a complex of the catalyst used in the reaction and the diamine or the ammonia produced in the reaction can be inhibited by keeping pH of the reaction system more basic than the neutralization point of the diamine and keeping the amine free, and simultaneously by keeping pH of the reaction system more acidic than the pH to form a complex of a diamine and a metal catalyst. This can ensure the reactivity of the diamine and can enable the polymerization reaction to proceed gradely. Therefore, polyamines of high-molecular weight being several tens of thousands or more can be easily produced, though it is difficult to produce them conventionally. The pH of the reaction system has an optimum value according to used diamines and dinitriles, and the pH of the reaction system is preferably kept at 10 or less. Further, it is necessary to keep the pH more basic than the neutralization point of the diamine in order for the amine to proceed its nucleophilic reaction because the reactivity of the amine deteriorates in the form of salt. Further, it is necessary to keep the pH more acidic than the pH to form the complex of the diamine and the metal catalyst. Accordingly, the pH of the reaction system is more preferably kept at 7 to 9.

The pH at starting to form the complex of the diamine and the metal catalyst is not measured strictly. However, in cases where the reaction solution is left overnight (for example, for 12 hours at a room temperature) on an experimental basis, a coloration of red to brown peculiar to the metal complex can be seen at pH of 9 or more. Accordingly, the pH at starting to form the complex is estimated to be in the vicinity. Therefore, the pH at starting to form a complex is defined to be pH when the solvent is colored during leaving the diamine and dinitrile in the solvent in the presence of the metal catalyst.

In the method for producing the polyamine of the present invention, the diamine may be provided by a reduction of dinitrile. In this case, a starting material of the reaction is a dinitrile only. When a part of the dinitrile is reduced to diamine, the reductive condensation of the diamine and the residual dinitrile proceeds on the basis of the reaction mechanism of the formula (7). By repeating these reactions, desired polyamines can be provided.

In the method for producing the polyamine of the present invention, an aminonitrile may be used as the starting material. In this case, the reductive condensation of an amino group in one aminonitrile molecule and a nitrile group in the other aminonitrile molecule proceeds on the basis of the reaction mechanism of the formula (7). By repeating these reactions, desired polyamines can be provided. The aminonitrile is not limited particularly, but may be, for example, at least one selected from the group consisting of glycinonitrile, aminopropionitorile, 2-aminobenzonitrile, 3-aminobenzonitrile, 4-aminobenzonitrile, 2-aminomethylbenzonitrile, 3-aminomethylbenzonitrile and 4-aminomethylbenzonitrile. In the case of using α-aminonitrile such as glycinonitrile, its monomer is unstable and six-membered ring piperazine derivatives which have stable structure are preferentially produced. Therefore, small quantity of polymers is provided. However, if β-aminonitrile and the like are used, they do not have a six-membered ring structure and the reaction can proceed gradely. Further, various kinds of polyamines can be synthesized because aminonitriles of the starting materials are reflected in the structures between the amino groups.

In the method for producing the polyamine of the present invention, the elimination of ammonia is conducted by providing hydrogen in the presence of the metal catalyst. The metal catalyst used in this case is not limited particularly, but may be, for example, a platinum group metal catalyst such as palladium or rhodium. The examination results by the inventors provide the fact that polyalkylene polyamine can be provided at a low cost and high yield in using palladium as the platinum group metal catalyst, but branched polyamines are produced as by-products in small quantity. Further, the examination results by the inventors provide the fact that linear polyamines can be provided at a high cost but selectively in using rhodium.

The platinum group metal catalyst can be supported by a support such as carbon, silica or alumina. By the support, the platinum group metal disperses finely, a function as a catalyst improves and a recovery of the catalyst after the reaction becomes easy. The examination results by the inventors provide the fact that desired polyamines can be provided at high yield and high selectively in using carbon as the support.

If an acid or an ammonium salt thereof is added to the reaction solution as a reaction accelerator, the reaction proceeds more efficiently. The added acid is not limited particularly, but may be, for example, at least one selected from the group consisting of organic acid such as trifluoroacetic acid, acetic acid and benzoic acid, inorganic acid such as hydrochloric acid and ammonium salt thereof. Among them, the addition of the ammonium salt of the organic acid enables the reaction to proceed more gradely.

In the method for producing the polyamine of the present invention, the solvent used in the reaction system is not limited particularly, but may be water or hydrophilic solvent such as alcohol, tetrahydrofuran, dioxane or dimethylformamide.

In the method for producing the polyamine of the present invention, it is very important to control the pH of the reaction system from the early period. A pH-adjusting agent can be used as the controlling of the pH. The pH-adjusting agent is not limited particularly, but may be, for example, inexpensive mineral acids and the like in using the free amine, and caustic soda, caustic potash, calcium hydrate, sodium carbonate and the like in using the salt of amine. In the case of using the salt, salts produced by a neutralizing may be removed by a filtration in order to proceed the reaction effectively.

The pH of the above reaction system is increased by ammonia produced in the reaction system. Accordingly, the pH may be controlled by a neutralizing. For the neutralizing of ammonia, it is not limited particularly, but for example, mineral acid and the like can be used.

The pH of the above reaction system may be controlled by a degassing of ammonia produced in the reaction system with hydrogen. In this case, the hydrogen used in the degassing of ammonia may be reused in the elimination of ammonia in the reaction mechanism of the formula (7) after separating ammonia.

The metal catalyst used in the reductive polycondensation polymerization may be a metal catalyst that was used in the other reductive polycondensation polymerization. In this case, it is effective that the metal catalyst that was used in the other reductive polycondensation polymerization is washed by inexpensive strong acid such as hydrochloric acid and the like and then reused in order to exclude an influence of the residual amine.

Typical polyamines of the present invention are, for example, produced by the reductive polycondensation polymerization with the elimination of ammonia between hexamethylenediamine, 2-methyl-1,5-pentanediamine that is an isomeric form of hexamethylenediamine and a mixture of these compounds used as the amine, and adiponitrile, methylglutaronitrile that is an isomeric form of adiponitrile and a mixture of these compounds used as the nitrile.

The method for producing the polyamine of the present invention enables polyamines of all kinds of constitutions to be produced easily by selecting constitutions of the parts between the amino groups in the both ends of the diamine, constitutions of the parts between the nitrile groups in the both ends of the dinitrile and constitutions of the parts other than amino group and the nitrile group of the aminonitrile because the reaction mechanism depends almost exclusively on the reaction between the amino group in the end of the diamine and the nitrile group in the end of the dinitrile.

EXAMPLES

Examples of the present invention are described below. However, they are provided for a better understanding of the present invention, and do not intend to limitations of the present invention.

Example 1

6.0 g of ethylenediamine (0.1 mol), 10.8 g of adiponitrile (0.1 mol), 1.7 g of ammonium acetate, 1.2 g of 10% palladium carbon (50% hydroscopic compound) and 30 ml of methanol were added in a 50 ml, four-necked round bottom flask, fitted with a stirrer, thermometer, a hydrogen blowing tube, a pH meter electrode, an dropping funnel and a condenser, and then an atmosphere in the reaction system was replaced by argon for explosion protection.

Concentrated hydrochloric acid was then added in the reaction system from the dropping funnel and pH of the reaction solution was controlled to 8.9.

Fine bubbles of hydrogen was then injected by using a sintered glass at normal pressures (pressure of 10 cm of liquid paraffin) with stirring the reaction solution at ambient temperature. The blow-by gas was diffused after bubbling with water for explosion protection. The pH of the reaction solution was monitored all the time and was controlled by adding hydrochloric acid in order no to be over 9. The water used in the bubbling of the blow-by hydrogen during the reaction has strong alkalinity. The blow-by gas stands indicates strong alkalinity in the same way by checking with a litmus paper, and ammonia odor was felt.

The reaction solution was clear and colorless after reacting for 10 hours and leaving it overnight.

Methanol in the reaction solution was evaporated after filtrating a catalyst in the solution, and at the same time, unreacted ethylenediamine in the solution was recovered.

The residue was then dissolved in 30 ml of 10% hydrochloric acid. In this case, an extraction was conducted three times with 20 ml of ethyl acetate, and then acetic acid detached from the reaction accelerator and unreacted adiponitrile were removed because small quantity of unreacted oil layer was separated.

The hydrochloric acid solution was then neutralized to pH 6.9 with 15% of caustic soda, and then pH was controlled to 10 or more by adding sodium carbonate powder. Undissolved sodium carbonate was dissolved by adding small quantity of water.

Using caustic soda only and controlling pH to 10 or more had no effect on the above alkalization.

An extraction was then conducted three times with 30 ml of ethyl acetate and residual unreacted ethylenediamine was removed.

An aqueous layer was evaporated by an evaporator and the pressure was reduced to constant mass with oil-sealed rotary pump.

The residue was a mixture of brown liquid and solid powder. 50 ml of ethanol was then added to the residue and dissolve organic matters. Then sodium chloride and excess sodium carbonate were separated by filtration and the residue was washed by 10 ml of ethanol twice.

The residue in ethanol was then evaporated and 50 ml of cold isopropanol was added. Then white powder precipitated.

The white powder was separated by the filtration, washed by 10 ml of cold isopropanol twice and then evaporated. Then 8.6 g of the white powder was provided.

The layer of isopropanol was evaporated by the evaporator and the pressure was reduced to constant mass with oil-sealed rotary pump. Then 4.6 g of viscous liquid was provided. This was poly(ethyleneiminohexamethyleneimine) and its total yield was 98.5%.

Further, the separated catalyst was washed by 10% hydrochloric acid, and then the above reaction was conducted by using the catalyst again. However, its catalytic activity did not deteriorate and the same result of the reaction was provided.

Example 2

As substitute for adiponitrile in Example 1, succinonitrile was used. As for the rest, Example 2 was conducted just like Example 1. As the result, poly(ethyleneiminotetramethyleneimine) was provided at a total yield of 95.4%.

Example 3

As substitute for ethylenediamine in Example 1, hexamethylenediamine was used. As for the rest, Example 3 was conducted just like Example 1. As the result, poly(hexamethyleneimine) was provided at a yield of 88.3% as white to gray wax solid material.

Example 4

As substitute for ethylenediamine in Example 1, 4,4'-dianilinomethane was used. As for the rest, Example 4 was conducted just like Example 2. As the result, poly(4,4'-diphenylmethyleneiminohexamethyleneimine) was provided at a yield of 41%.

Example 5

10.5 g of sulfate salt of glycinonitrile (0.05 mol) and 50 ml of methanol were added in a 300 ml, four-necked round bottom flask and the solution was stirred and suspended. 25% of caustic soda solution was gradually added in the solution with the flask cooled in an ice bath and then pH of the solution was controlled to 10 or more.

The solution was suspended in white at first. However, the solution became suspended solution in black-red as soon as the neutralizing stared.

The solution was stirred for 30 minutes, precipitate sodium sulfate was filtrated and then washed by small quantity of methanol. Then the methanol solution of glycinonitrile was provided.

The above prepared glycinonitrile solution, 1.7 g of ammonium acetate, and 1.2 g of 10% palladium carbon (50% hydroscopic compound) were added in a 100 ml, four-necked round bottom flask, fitted with a stirrer, thermometer, a hydrogen blowing tube, a pH meter electrode, an dropping funnel and a condenser, and then an atmosphere in the reaction system was replaced by argon for explosion protection.

Concentrated hydrochloric acid was then added in the reaction system from the dropping funnel and pH of the reaction solution was controlled to 8.5.

Fine bubbles of hydrogen was then injected by using a sintered glass at normal pressures (pressure of 10 cm of liquid paraffin) with stirring the reaction solution at ambient temperature. The blow-by gas was diffused after bubbling with water for explosion protection. The pH of the reaction solution was monitored all the time just like Example 1 and was controlled by adding hydrochloric acid in order no to be over 9.

The solution was brown after reacting for 24 hours. However, the solution changed to be black-red after shutdown of providing hydrogen and then leaving for a while.

Methanol in the reaction solution was evaporated after filtrating a catalyst in the solution.

The residue was then dissolved in 30 ml of 10% hydrochloric acid. An extraction was then conducted three times with 20 ml of ethyl acetate, and then acetic acid detached from the reaction accelerator was removed. The hydrochloric acid solution was then neutralized to pH of 10 or more with 15% caustic soda.

An extraction was then conducted three times with 30 ml of ethyl acetate. Massive amount of piperazine was detected in the solution by a gas chromatography.

An aqueous layer was evaporated by an evaporator and the pressure was reduced to constant mass with oil-sealed rotary pump.

The residue was a mixture of brown liquid and solid powder. 50 ml of ethanol was then added to the residue and dissolve organic matters. Then sodium chloride was separated by filtration and the residue was washed by 10 ml of ethanol twice.

The residue in ethanol was then evaporated. 50 ml of cold isopropanol was then added, a soluble part was separated by the filtration and then evaporated. Then 1.3 g of brown viscous liquid was provided.

The yield was 30.2%.

(Analysis)

The polymers provided in the above Examples were white powders that precipitated from alcohol in alkalinity and high viscosity (just like starch syrup) liquid. Accordingly, it cannot be deemed that the polymer is at low-molecular weight and hydrochloride salt or carbonate. Therefore, the analysis for polymer of high-molecular weight was conducted.

The analysis was conducted on GPC, MASS and NMR.

It is well-known that the analysis of molecular weight of polyamines by GPC is difficult because amines was adsorbed to carbonyl group or —OH that remain at a filler. The polymer provided by in the above Examples also indicated their single peak at vicinity of molar weight 1,000.

Accordingly, the analysis was conducted by FAB-MASS (maximum molar weight 30,000). However, outstanding mass number was 800 to 900 that fell far short of expectations. Therefore, the analysis was then conducted by IT-TOF-MASS.

As an example, a IT-TOF-MASS chart of the polymer of Example 2 is indicated in FIG. 1. By the IT-TOF-MASS, a lot of polyvalent ions are detected in mass number between 3,000 and 4,000 in the spectrum, and as a result, it suggests that the polyamines are polymers of high-molecular weight being distributed in a range of several tens of thousands or more. However, the molecular weight could not be identified.

Figure 2:
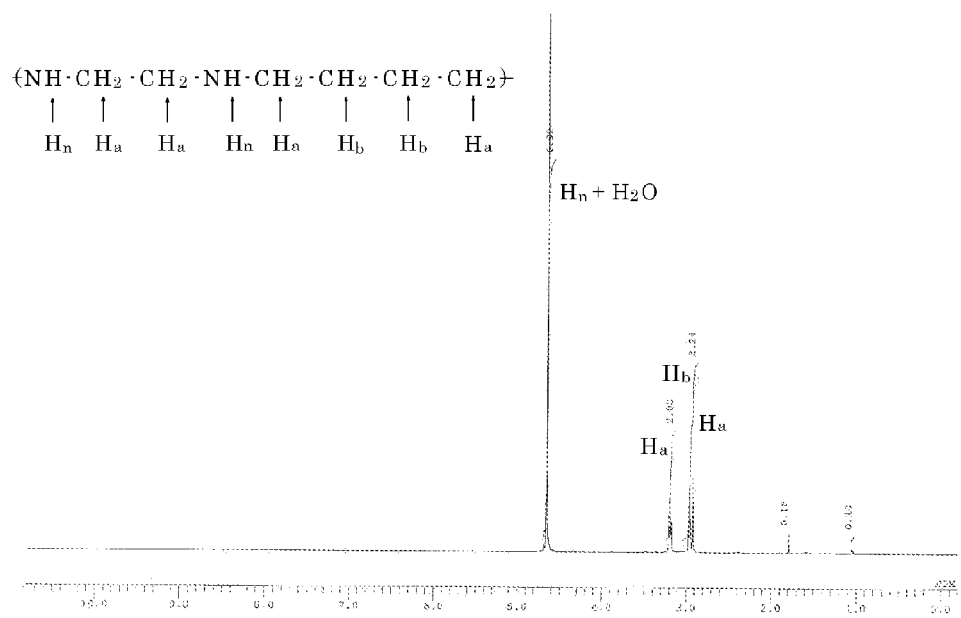
FIG. 2 is a proton NMR chart of the poly(ethyleneiminotetramethyleneimine) of Example 2, which was measured by heavy methanol.
Figure 3:
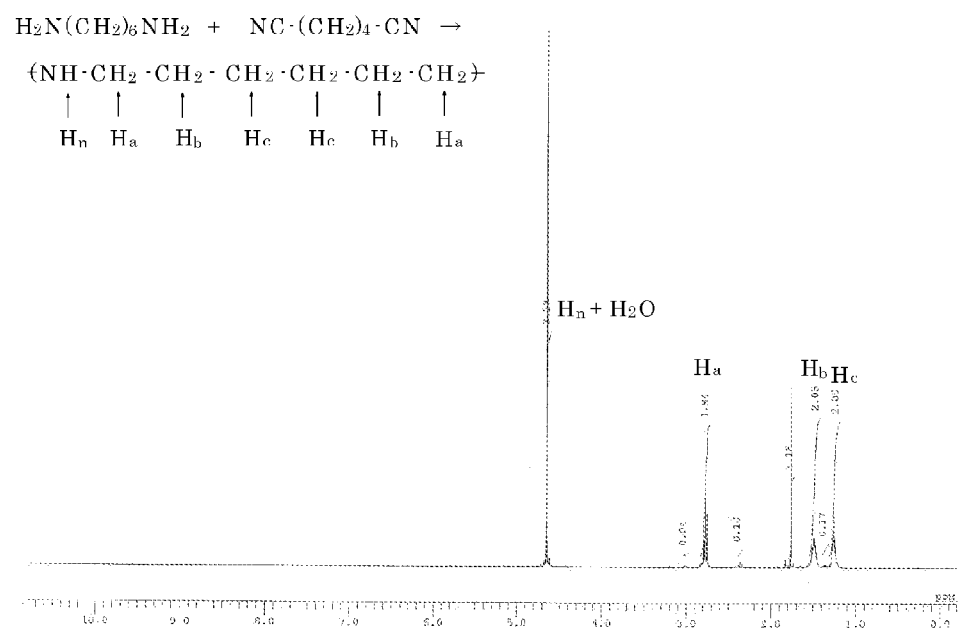
FIG. 3 is a proton NMR chart of the poly(hexamethyleneimine) of Example 3, which was measured by heavy methanol.

As a measurement example, a proton NMR chart of the poly(ethyleneiminotetramethyleneimine) of Example 2, which was measured by heavy methanol is indicated in FIG. 2, and a proton NMR chart of the poly(hexamethyleneimine) of Example 3, which was measured by heavy methanol is indicated in FIG. 3. The belongingness of signals are indicated in the figures.

Almost same NMR charts are obtained regarding the viscous parts and the powdered parts. The signals of the viscous parts are broader than those of the powdered parts. Therefore, it is deemed that branched polymers mix in the viscous parts.

Comparative Example 1

0.6 g of ethylenediamine (100 mmol), 1.1 g of adiponitrile (100 mmol), 0.2 g of ammonium acetate, 0.12 g of 10% palladium carbon (50% hydroscopic compound) and 3 ml of methanol were added in a 10 ml autoclave, and then at a pressure of 5 kg/cm$^2$ of hydrogen, the reaction was conducted at room temperature. The reaction solution then changed to be black-red. The post treatment was conducted on the amine component of the provided solution. However, both viscous parts and powdered parts could not be provided and all of them were extracted in the layer of ethyl acetate. Though the catalyst was then filtrated and the reaction was conducted in the same way, the reaction did not proceed.

What is claimed is:

1. A method for producing a polyamine, the method comprising performing a reductive polycondensation polymerization of diamine and dinitrile with elimination of ammonia and maintaining the pH of a reaction system at a more basic pH than the neutralization point of the diamine and more acidic than the pH needed to form a complex of a diamine and a metal catalyst.

2. The method according to claim 1, wherein the diamine is provided by a reduction of dinitrile.

3. A method for producing a polyamine, the method comprising performing a reductive polycondensation polymerization of aminonitrile with elimination of ammonia and maintaining the pH of a reaction system at a more basic pH than the neutralization point of the diamine and more acidic than the pH needed to form a complex of a diamine and a metal catalyst.

4. The method according to claim 3, wherein the aminonitrile is at least one member selected from the group consisting of glycinonitrile, aminopropionitorile, 2-aninobenzonitrile, 3aminobenzonitrile, 4-aminobenzonitrile, 2-aminomethylbenzonitrile, 3-aminomethylbenzonitrile and 4-aminomethylbenzonitrile.

5. The method as defined by claim 1, wherein the elimination of ammonia is conducted by providing hydrogen to the reaction system in the presence of a platinum group metal catalyst.

6. The method according to claim 5, wherein the platinum group metal catalyst is palladium or rhodium.

7. The method as defined by claim 1, wherein the pH of the reaction system is maintained at 10 or less.

8. The method according to claim 7, wherein the pH of the reaction system is maintained at 7 to 9.

9. The method as defined by claim 1, wherein solvent used in the reaction system is water or a hydrophilic solvent.

10. The method according to claim 9, wherein the hydrophilic solvent is a solvent selected from the group consisting of alcohol, tetrahydrofuran, dioxane and dimethylformamide.

11. The method as defined by claim 1, wherein an initial pH of the reaction system is controlled with a pH-adjusting agent.

12. The method as defined by claim 1, wherein the pH of the reaction system is controlled with a neutralization of ammonia produced in the reaction system.

13. The method according to claim 12, wherein mineral acid is used in the neutralization of ammonia.

14. The method as defined by claim 1, wherein the pH of the reaction system is controlled by a degassing of ammonia produced in the reaction system with hydrogen.

15. The method according to claim 14, wherein the hydrogen used in the degassing of ammonia is reused in further reductive polycondensation polymerization for the elimination of ammonia.

16. The method as defined by claim 1, wherein the metal catalyst used in the reductive polycondensation polymerization is a metal catalyst that was used in another reductive polycondensation polymerization.

17. The method according to claim 16, wherein the metal catalyst used in the reductive polycondensation polymerization is washed by acid and then reused.

* * * * *